(No Model.)
J. J. GLACKIN, Jr., & E. J. GLACKIN.
CAN SOLDERING MACHINE.
No. 278,329. Patented May 29, 1883.
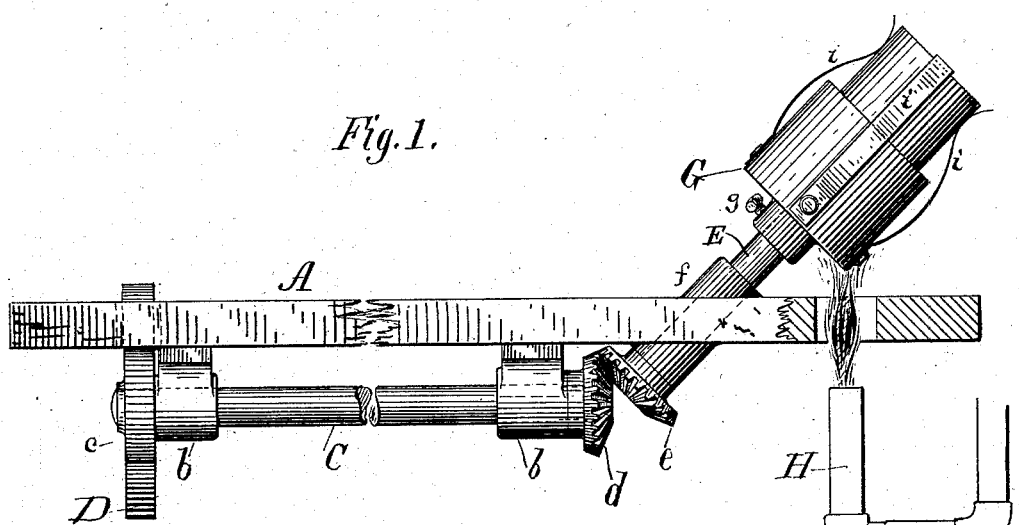
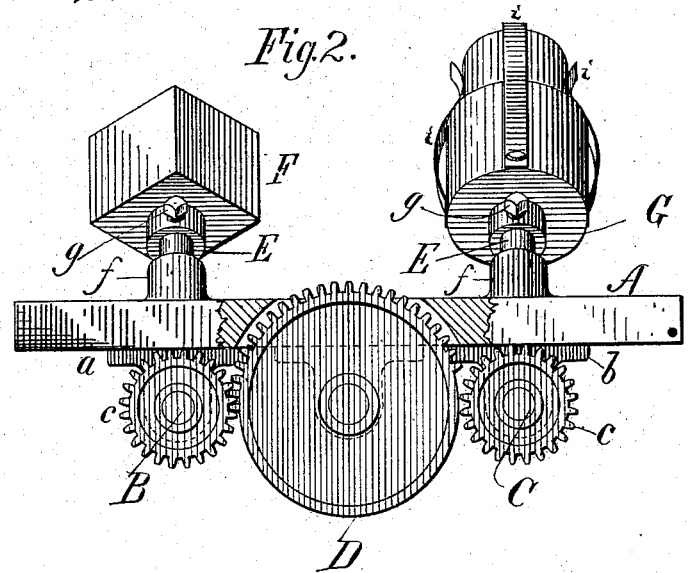
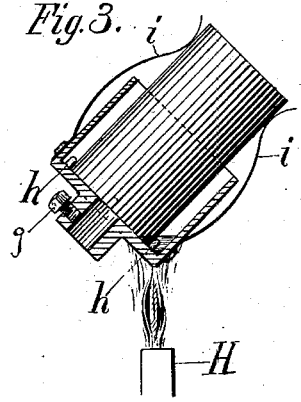
Witnesses:
Matt. A. Beck.
Frank S. Blanchard.
Inventor:
James J. Glackin Jr.,
Edward J. Glackin
By Jno. G. Elliott
Attorney.

ns of our in# UNITED STATES PATENT OFFICE.

JAMES J. GLACKIN, JR., AND EDWARD J. GLACKIN, OF CHICAGO, ILLINOIS.

CAN-SOLDERING MACHINE.

SPECIFICATION forming part of Letters Patent No. 278,329, dated May 29, 1883.

Application filed October 9, 1882. (No model.)

*To all whom it may concern:*

Be it known that we, JAMES J. GLACKIN, Jr., and EDWARD J. GLACKIN, both citizens of the United States, residing in Chicago, county of Cook, and State of Illinois, have invented certain new and useful Improvements in Can-Soldering Machines, of which the following is a specification.

Our invention relates to improvements in can-soldering machines in which the can-holder employed revolves the can at an oblique angle to the plane of a stationary solder receptacle or reservoir, into which receptacle the can is projected and revolved to solder its angular edges and corners, said reservoir being heated by suitable means to maintain the solder in a molten state, ready for use.

The objects of our invention are to provide a can-holder and reservoir simultaneously revolving together and in the same direction, and at an oblique angle to a horizontal plane, to so combine the can-holder and reservoir that they may be revolved upon a single shaft, to provide a revolving soldering-reservoir requiring a minimum amount of solder consistent with the practical soldering of a can projected and revolving in said reservoir, and, finally, to provide a revolving soldering-reservoir the solder in which may be effectually heated and maintained in a molten state with a minimum amount of heat. We attain these objects by devices illustrated in the accompanying drawings, in which—

Figure 1 is a side elevation of a can-soldering machine embodying our invention; Fig. 2, a rear end elevation of the same, and Fig. 3 a detail longitudinal section of our combined can-holder and solder-reservoir.

Similar letters of reference indicate the same parts in the several figures of the drawings.

A represents a horizontal table, provided on its under side with hangers *a a* and *b b*, in which are journaled parallel shafts B C, provided upon their rear ends with pinions *c c*, meshing with a mutilated gear, D, journaled in a hanger at the rear end of the table.

Shafts B C are provided at their forward ends with bevel-pinions *d*, meshing with corresponding pinions, *e*, upon the ends of the shafts E E, arranged at an oblique angle to the plane of the table A, and bearing in bushings *f f*, projecting through the table.

Shafts E E have removably secured on their outer ends square and circular soldering-receptacles F G, respectively, the axes of which receptacles are in a line with their respective shafts. These soldering-receptacles are removably secured to the shafts by means of set-screws *g g*, and, while providing for simultaneously operating upon a square and round can, also provide, by reason of their removability, for simultaneously operating upon two cans of either shape by substituting a square receptacle for the round one shown, and vice versa the square receptacle. This operation will be understood when it is remembered that more or less time is required in placing a can in the receptacle and removing the can after it is soldered, and that such placing and removing is not convenient when the receptacle is revolving. To render the can stationary at such times the pinions *c c* are alternately engaged with the gear D by reason of the mutilated condition of the gear; hence the round receptacle in Fig. 2 is stationary, to remove a soldered can and insert an unsoldered one, while the square receptacle is revolving and applying solder to a can previously placed therein. These receptacles, as shown in Fig. 3, are of somewhat greater diameter than the cans to be operated upon, and have their bottoms provided with pins *h h*, to center and prevent the cans from shifting about and dropping down too far into the solder held in the angles of the reservoirs.

The reservoir of the round can is provided with three or more curved springs, *i i*, rigidly secured to the reservoir and clamping the sides of the can at a point above the reservoir, to more securely hold the can against a lateral or longitudinal movement after being placed in its operative position; but instead of these particular springs others may be employed inside the sides of the reservoir, or we may employ studs in the sides of the reservoir without departing from the spirit of our invention.

Centering the cans as above described provides an annular chamber between the can and the reservoir, and this chamber, in connection with the inclined position of the reservoir, enables the employment of a minimum amount of solder in the reservoir for operating upon the cans, and also for the convenient introduction of fresh solder for supplying the demands of the reservoir, as the solder therein is taken up by the can under the process of being soldered. These reservoirs are heated to render and keep the solder in a molten state by a gas-jet, H, arranged below the table, which is provided with a suitable opening, through which the flame of the jet passes and comes in contact with the lowest extremity of the reservoir, at which point the molten solder, owing to its gravity, remains during the revolutions of the reservoir.

The friction of the reservoir when revolving upon the solder will, to a limited extent, incline the surface of the solder, and this result may be utilized to regulate the amount of solder applied to a can by increasing or diminishing the rapidity of the reservoir; but in any case a very small quantity of solder in a reservoir, and supply heat for the solder, is necessary for the successful operation of the machine.

The duplex arrangement of our soldering-machine recommends it on account of the rapidity with which cans may be manipulated by a single operator, and therefore forms an important part of our invention, and especially so for the reason that we attain this end without the employment of complex and correspondingly costly mechanism.

Combining the can-holder and revolving it with the solder-reservoir in the manner described dispenses with skilled labor for inserting the cans to place and centering them, and, besides, less time is required for these purposes than in the more complicated machines commonly used in large factories.

Having described our invention, what we claim, and desire to secure by Letters Patent, is—

1. In a can-soldering machine, a revolving can-holder, the axis of which is inclined with reference to a horizontal plane, the angle caused by the meeting of its ends and sides forming a soldering-receptacle extending beyond the periphery of the can to be soldered, in combination with means for centering the can in the holder, and mechanism for actuating said holder, all substantially as described.

2. The combination, with the revolving soldering-reservoir and the centering-pins projecting from the bottom thereof, of curved springs projecting from the sides of the reservoir, and adapted to engage with and removably hold the can to be soldered in the reservoir, substantially as described.

3. The combination, with the revolving solder-reservoirs, the axes of which are at an oblique angle to a horizontal plane, and with the shafts $f\ f$ and B C and their respective pinions, of the mutilated revolving gear arranged intermediate and intermittingly operating said shafts, substantially as described.

JAMES J. GLACKIN, JR.
EDWARD J. GLACKIN.

Witnesses:
JNO. G. ELLIOTT,
W. W. ELLIOTT.